Figure 1:
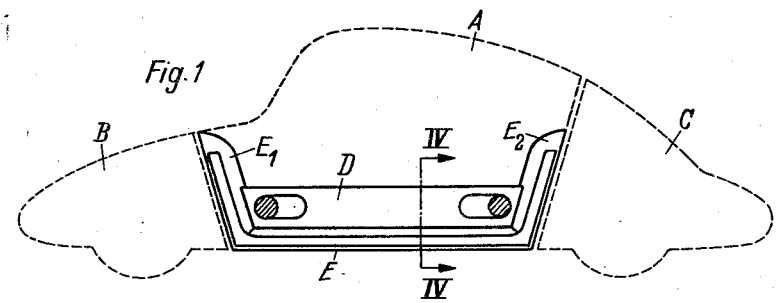

June 7, 1955   B. BARÉNYI   2,710,222
REINFORCED FLOOR PLATE FOR BODY OF SECTIONAL AUTOMOBILE
Filed Jan. 20, 1950   2 Sheets-Sheet 1

Inventor
Béla Barényi
By Diche and Padlon
Attorneys united States Patent Office 2,710,222
Patented June 7, 1955

2,710,222

REINFORCED FLOOR PLATE FOR BODY OF SECTIONAL AUTOMOBILE

Béla Barényi, Stuttgart-Rohr, Germany

Application January 20, 1950, Serial No. 139,609

Claims priority, application Germany January 22, 1949

8 Claims. (Cl. 296—28)

This invention relates to vehicle bodies with a bottom plate, having at least one upwardly bent end, and has particular reference to the middle cell of a motor vehicle designed and produced according to a so-called cell, section or bay-type construction, consisting of a plurality of separately made sections or cells.

It is a primary object of the invention to provide a car body having a particularly stiff structure.

Another object of the invention is to reduce the weight and to facilitate the manufacture of the car body.

With these and further objects in view which will hereinafter appear, according to one feature of the invention the bottom plate is stiffened by longitudinally extending stiffening members forming, for instance, hollow bearers which may even extend entirely or partly over the upwardly bent end or terminal part or parts of the bottom plate. The stiffening members may be completed to hollow bearers by the bottom plate itself or they may form a structural unit with the bottom plate. The hollow bearers may be arranged on the inner side, i. e., on the upper side, or on the outer side, i. e., on the lower side, of the bottom plate and may be formed as central bearers or as lateral bearers or in the form of a double-walled bottom.

Moreover, the bottom plate may form a structural unit with the frame of the chassis or with the frame of the car body, the frame members simultaneously achieving an additional stiffening of the bottom plate. Advantageously in this connection a frame is provided comprising two lateral longitudinal bearers and two cross bearers bent outwardly towards the opposite ends of the vehicle; the transverse or cross bearers are arranged as close as as possible to the upwardly bent parts of the bottom plate, within the same. A further stiffening of the bottom plate can be achieved by the provision of stiffening sheets or plates between the longitudinal bearers of the frame, e. g., between the side bearers and a central stiffening bearer. The hollow bearer elements consisting more particularly of sheet metal may be welded or detachably connected to the bottom plate, for instance by screwing.

According to a further feature of the invention the stiffening bearers may be used for the installation of cables, pipe lines or similar elements or directly for the passage of air, for instance, heating or fresh air.

A bottom plate designed in accordance with the invention is particularly suitable for cell- or box-type structures since the end faces serving for connection of the adjacent cells are stiffened particularly efficiently by the bottom plate and the lower part of the central box or cell as a whole is given a high stiffness against torsion. Advantageously the bottom plate is bulged both at its end parts and in its central horizontal part, whereby, on the one hand, the strength is further increased and, on the other hand, the interior space of the car becomes more spacious. The upwardly bent end parts of the bottom plate advantageously close the inner space of the car body at the front and rear ends thereof.

Other and further objects, features and advantages of the invention will be pointed out hereinafter and appear in the appended claims forming part of the application.

In the accompanying drawings several preferred embodiments of the invention are shown by way of illustration and not by way of limitation.

Figure 2:
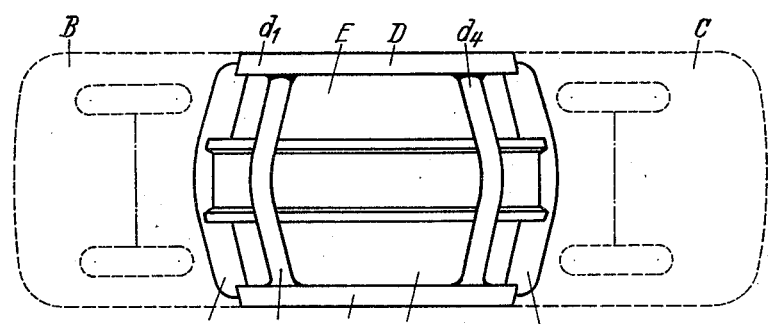
Figure 3:
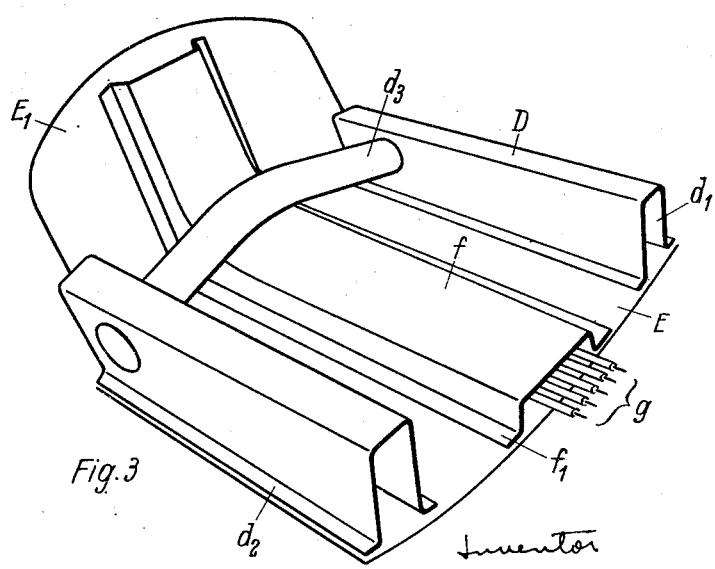
Figure 4:

Fig. 1 is a cross-sectional view taken along the central longitudinal plane of Figure 2 of a cell-type vehicle provided with a bottom plate in accordance with the present invention, Fig. 2 is a plan view on the vehicle showing a preferred embodiment of the invention, Fig. 3 is a perspective view of one half of the bottom plate according to Figs. 1 and 2, combined to a constructional unit with the chassis frame, Fig. 4 is a cross section of the bottom plate according to Figs. 1 to 3, and Figs. 5 to 12 are cross sectional views showing various modifications of the cross section of the bottom plate, in some instances including the vehicle frame.

Similar reference numerals denote similar parts in the different views of the drawing.

Referring now to the drawings in greater detail, and first to Figs. 1 and 2, it will be seen that the vehicle comprises a middle or central cell or section A, a front cell or section B and a rear or stern cell or section C. The chassis frame D and the bottom plate E are combined to a structural unit as will be seen especially from Figs. 3 and 4. In this case the chassis frame D is formed of two lateral longitudinal bearers $d_1$ and $d_2$ and two transverse or cross bearers $d_3$ and $d_4$ which are bulged towards the front or rear sides, said cross bearers having, for instance, a tubular cross section, being passed through the longitudinal bearers $d_1$, $d_2$ and welded thereto at the passage points. The longitudinal bearers $d_1$, $d_2$ are U-shaped and provided with end flanges bearing on the bottom plate E and being connected thereto, for instance, by spot welding. The bearers $d_1$, $d_2$ and the bottom plate E thus form together box-shaped cross sections.

The bottom plate E which in most instances will consist of a metal sheet or plate is downwardly bulged, for instance cylindrically, and its ends are upwardly bent with an inclined slope; the end portions $E_1$ and $E_2$ may be formed according to the gaps between the central cell A and the end cells B or C and close the middle cell with respect to this gap. If desired, perforations may be provided in the end plates $E_1$, $E_2$ for passing the connecting members. These end or terminal parts are moreover also outwardly bent, i. e. advantageously in accordance with the configuration of the outwardly bent cross bearers $d_3$ or $d_4$ of the frame which, for instance, may be arrow-shaped. Advantageously the ends of the longitudinal bearers $d_1$ or $d_2$ thereof abut the end parts $E_1$ or $E_2$ of the bottom plate and are closed by the same at their ends.

Furthermore, in order to stiffen the bottom plate a bent bearer $f$ of U-shaped cross section is provided extending in the central longitudinal plane of the vehicle over the whole length of the bottom plate including the end parts $E_1$ or $E_2$, its flanges $f_1$ bearing on the bottom plate E. The bearer $f$ may again be welded on the bottom plate or connected thereto, for instance, by screws or bolts. The hollow bearer thus formed serves advantageously for accommodation of cables $g$, pipe lines or the like. It may also be used for the conduction of air, for instance, for heating or ventilating purposes.

Figure 5:
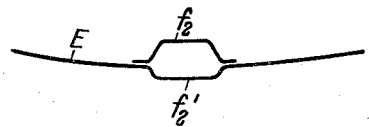
Figure 6:
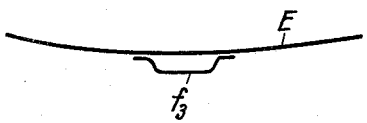
Figure 7:
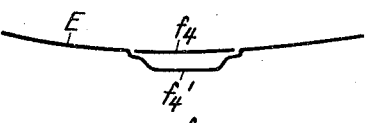
Figure 8:
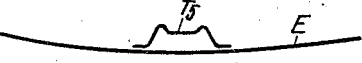
Figure 9:
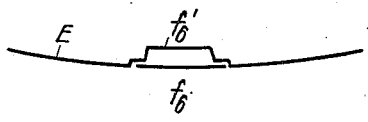

In the embodiments shown in Figs. 5 to 9, the central hollow stiffening bearer is formed in a similar manner as hereinbefore described by U-shaped or plate-shaped wall elements $f_2$ to $f_6$; the bottom plate may either be non-bulged or it may be bulged for forming the stiffening bearer, for instance at $f_2'$, $f_4'$ or $f_6'$, in an appropriate manner. The stiffening bearer portion of the bottom plate in this case may extend above as in Figs. 8 and 9 or underneath Figs. 6 and 7 the bottom plate, or it may project beyond the surfaces of the bottom plate in an upward or downward direction, as shown in Fig. 5.

Figure 10:
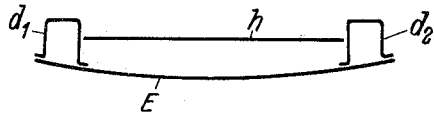

In the embodiment according to Fig. 10, the two longitudinal bearers $d_1$, $d_2$ are interconnected by a metal plate $h$ thus forming in this case a double bottom $h$, E or a broad hollow bearer formed by the longitudinal bearers $d_1$, $d_2$ and the plates E, $h$.

Figure 11:
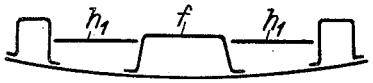
Figure 12:
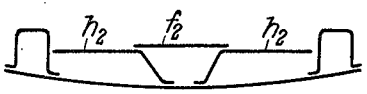

In the modification shown in Fig. 11, the central stiffening bearer $f$ is stiffened additionally by a metal plate $h_1$ with respect to each of the two longitudinal bearers, so that the whole bottom part of the car body is formed by a number of parallel hollow bearers. It is also possible, for instance, to provide an arrangement in such a way, that as shown in Fig. 12, the central hollow bearer is partly formed by the lateral plates $h_2$ and the additional covering plate $f_7$.

For the rest, the explanations given above regarding the embodiment shown in Figs. 1 to 4 apply mutatis mutandis also to Figs. 5 to 12. In each case the bottom plate may be used as a separate constructional element or combined with the frame of the chassis or of the car body to form a constructional unit.

While the invention has been described in detail with respect to certain preferred examples and embodiments of the invention, it will be understood by those skilled in the art after understanding the invention, that various changes and modifications may be made without departing from the spirit and scope of the invention and it is intended, therefore, to cover all such changes and modifications in the appended claims.

Having thus described my invention, I claim as new and desire to secure by Letters Patent:

1. In a motor vehicle, a car body section including a bottom plate with an upwardly bent end portion having an inclined slope at least at one end thereof, a stiffening bearer extending in a longitudinal direction at least over a substantial portion of the upwardly bent end portion of said bottom plate, said upwardly bent end portion of said bottom plate being curved outwardly as viewed in a top plan view, lateral stiffening bearers for said bottom plate, said stiffening bearers extending in a longitudinal direction at both sides thereof up to the upwardly bent end portion of said bottom plate closing said stiffening bearers at least at one end, and transverse hollow bearers for mutually stiffening the ends of said stiffening bearers.

2. In a motor vehicle, the combination as in claim 1, in which said first-mentioned stiffening bearer is formed by a bulged portion of the bottom plate in connection with covering sheets making up hollow bearers together with the bulged portions.

3. In a motor vehicle, the combination as in claim 1, wherein said first-mentioned stiffening bearer and the lateral stiffening bearers are formed by bulged portions of the bottom plate in connection with metal sheets forming hollow bearers together with the bulged portions.

4. In a multi-sectioned motor vehicle having a central compartment and two end compartments, a floor plate having upwardly bent terminal parts for said central compartment, said terminal parts being arched outwardly of the floor plate, a reinforcing beam in the longitudinal center of said central compartment having walls essentially U-shaped in cross section, the open side of said U-shaped reinforcing beam facing the floor plate and being suplemented by the latter to form a hollow beam therewith extending up to said upwardly bent terminal parts of said floor plate, said floor plate further including two lateral hollow marginal reinforcing frame members extending over the whole length of the horizontal part of said floor plate, and means including hollow transverse beams for reinforcing said lateral frame members at ends thereof with respect to each other, said transverse beams consisting of tubes connected with each of their ends to the respective inner side wall of the lateral hollow marginal frame members and in their middle parts bowed upwardly so as to extend freely over said reinforcing beam in the longitudinal center of the central compartment.

5. In a multi-sectioned motor vehicle according to claim 4 wherein said lateral hollow frame members are also U-shaped and supplemented by said floor plate to form hollow beams therewith.

6. In a multi-sectioned motor vehicle according to claim 5 further comprising plates between said two lateral frame beams and said central reinforcing beam thereby producing hollow reinforcing beams adjacent to each other over the entire transverse section of the floor.

7. In a multi-sectioned motor vehicle according to claim 4 wherein among the reinforcing members thereof at least the reinforcing beam in the longitudinal center of the compartment is formed by sheet walls which are disengageably connected with said floor plate.

8. In a multi-sectioned motor vehicle according to claim 4 wherein among the reinforcing members at least the reinforcing beam in the longitudinal center of the compartment is adapted to receive conductors passing from one end compartment to the other end compartment via the central compartment.

References Cited in the file of this patent

UNITED STATES PATENTS

| | | |
|---|---|---|
| 1,189,284 | Nelson | July 4, 1916 |
| 2,112,101 | Kliesrath | Mar. 22, 1938 |
| 2,151,865 | Nallinger | Mar. 28, 1939 |
| 2,168,436 | Bruss | Aug. 8, 1939 |
| 2,190,551 | Swallow | Feb. 13, 1940 |
| 2,226,790 | Valletta | Dec. 31, 1940 |
| 2,292,646 | McIntosh et al. | Aug. 11, 1942 |
| 2,662,793 | Lindsay | Dec. 15, 1953 |

FOREIGN PATENTS

| | | |
|---|---|---|
| 489,604 | Great Britain | July 29, 1938 |
| 506,845 | Great Britain | June 6, 1939 |
| 769,380 | France | June 5, 1934 |
| 787,258 | France | July 1, 1935 |
| 870,108 | France | Mar. 3, 1942 |
| 884,399 | France | Apr. 27, 1943 |

OTHER REFERENCES

Serial No. 368,684, Barényi et al. (A. P. C.), published May 25, 1943.